US006897885B1

United States Patent
Hao et al.

(10) Patent No.: US 6,897,885 B1
(45) Date of Patent: May 24, 2005

(54) INVISIBLE LINK VISUALIZATION METHOD AND SYSTEM IN A HYPERBOLIC SPACE

(75) Inventors: Ming C. Hao, Palo Alto, CA (US); Adrian Krug, Langenfeld (DE); Meichun Hsu, Los Altos Hills, CA (US); Umeshwar Dayal, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 466 days.

(21) Appl. No.: 09/596,804

(22) Filed: Jun. 19, 2000

(51) Int. Cl.[7] .............................................. G09G 5/00
(52) U.S. Cl. ........................................................ 345/853
(58) Field of Search ................................. 345/853, 854, 345/839, 841

(56) References Cited

U.S. PATENT DOCUMENTS

| | | | | |
|---|---|---|---|---|
| 5,515,487 A | * | 5/1996 | Beaudet et al. | 345/440 |
| 5,619,632 A | * | 4/1997 | Lamping et al. | 345/441 |
| 6,108,698 A | * | 8/2000 | Tenev et al. | 709/220 |
| 6,237,006 B1 | * | 5/2001 | Weinberg et al. | 707/103 R |
| 6,300,957 B1 | * | 10/2001 | Rao et al. | 345/441 |
| 6,377,287 B1 | * | 4/2002 | Hao et al. | 345/853 |

* cited by examiner

*Primary Examiner*—Kristine Kincaid
*Assistant Examiner*—Thanh Vu

(57) ABSTRACT

An visualization technique to unclutter the display and ease navigation in a large highly connected hyperbolic space. The visualization technique can be implemented by using an invisible link processor to execute an invisible link program. Initially, the invisible link processor only shows or displays the primary links (e.g., the parent-child path) of each node. All other non-primary links (e.g., secondary links or non-tree links) are invisible (i.e., not displayed for the user). Then, upon user selection the invisible link processor automatically maps the secondary child and sub-nodes associated therewith to the current selected node. The invisible link processor automatically restores (i.e., returns the previously moved secondary child and related sub-nodes to the original location in the hyperbolic space) upon receipt of a reset command. The visualization technique employs a link table, a link history log, and placeholders to check relationships among nodes including cyclic conditions. The visualization technique allows a user to freely focus on the hierarchy of interest without being disrupted by extra cross lines and intersections.

7 Claims, 7 Drawing Sheets

INVISIBLE LINK VISUALIZATION METHOD AND SYSTEM IN A HYPERBOLIC SPACE

FIELD OF THE INVENTION

The present invention relates generally to large hierarchical graphs, and more specifically, to a system and method for visualizing both cyclic and non-cyclic relationships in large hierarchical graphs by using invisible links in a hyperbolic space.

BACKGROUND OF THE INVENTION

We live in the information age in which there is a constant flow of information and data. Often times we struggle on a personal level to make sense of the data and avoid information over-load. Similarly, businesses often struggle to manage and properly handle the massive amounts of data that may be generated on a daily basis by business processes. Without mechanisms and tools to handle and process this data, these businesses can easily be overwhelmed by the information.

As can be appreciated, raw data without any structure or form is generally not very useful for businesses. Consequently, there is an increasing need for tools that businesses can use to extract useful business intelligence from the data. These tools include knowledge discovery and data mining (KDD) applications. Many real-world KDD applications involve the analysis of large hierarchies, such as, Internet resources, hot topics on the World Wide Web (WWW), files systems, and organization charts. These large hierarchies can be expressed as hyperbolic trees.

Recently, there has been interest directed to the visual mining (e.g., visual analysis) of large hierarchies with millions of nodes. For example, in web-related data mining, it is desirable for a user to be able to visualize the content and usage of the web. It is a challenge to display millions of documents in a compact and easy-to-visualize format (e.g. on a single screen or display). This display format should facilitate a user's ability to navigate through and to access information from these documents. Using a hyperbolic space representation provides an elegant solution to display large hierarchies on a user screen.

In a directed hierarchical hyperbolic tree, nodes are organized along parent and child relationships. A parent can have many children, but a child can have only one parent. For example, in an organization chart hyperbolic tree, a manager can have many employees, but each employee can report to only one manager. However, in practice, this tree structure may not be sufficient to accurately reflect reality in the workplace. For example, an employee may in reality report to two or more managers (e.g., a regular manager and a temporary project manager). In order to represent these relationships, two paths are needed: (1) one path from the employee to the regular manager, and (2) one path from the employee to the temporary project manager.

Even this simple example suggests that strict hierarchical tree structures are often too restrictive since there are often relationships that need to be linked to a different branch of the tree. The links to a different branch of the tree are commonly referred to in the art as cross-links, secondary links, non-tree edges, or cross edges.

One prior art approach for representing these cross-links in a hyperbolic space is to draw lines between the nodes that are connected or linked. For example, this prior art approach uses additional lines to depict secondary relationships in the hyperbolic tree. The Hyperbolic Tree Toolkit is a commercially available product from Inxight Software that uses this type of approach.

Unfortunately, when many lines and intersections are introduced to represent the secondary relationships, the display becomes confusing, cluttered and difficult to visualize. Furthermore, for far away nodes that are off the screen, this approach displays "broken" lines that do not terminate in a node on the current display, which can add to the confusion. FIG. 7 illustrates a highly connected hierarchical tree with cycles, such as a cycle that is formed by OfficeProduct, Microsoft BackOffice, and SQL Server. As can be seen, the prior art display of this hierarchical tree is very cluttered, confusing, and very difficult to navigate.

Another prior art approach simply prohibits secondary links limiting the hyperbolic tree to a strict hierarchical structure (i.e., allowing each child to have only a single parent node). Although this approach provides a more un-cluttered display, as discussed previously, many real-world applications can only be realistically modeled by using cross-links to indicate relationships between different elements in a system. For example, Web pages are often organized in a standard book format having a table of contents with different URL addresses listed therein. A user can jump to a particular section in the book (e.g., a particular chapter) by clicking on the appropriate URL. When the user is viewing the first page of the selected chapter, the user may be presented with a menu of options somewhere on that page that lists the table of contents URL. Similarly, if the information contained in this chapter relates to another section in another chapter in the book, a jump-site URL can be provided. Consequently, this approach offer an incomplete solution at best to many applications with cross-relationships requiring more than one parent node for a child node.

In summary, the prior art approaches to displaying relationships between nodes in hyperbolic space offer only tolerable solutions that have much to be desired. These prior art approaches fail to display a clean and easy-to-view hyperbolic space. Instead, these prior art approaches provide displays that often leave the users lost, confused, and overwhelmed with many complex displays.

Based on the foregoing, it is desirable to provide a mechanism that links a large highly connected graph in a hyperbolic space without cluttering the display.

SUMMARY OF THE INVENTION

It is an object of the present invention to provide a visualization method that uses invisible links to simplify or ease user navigation of large highly connected hyperbolic space.

It is another object of the present invention to provide a visualization method that uses invisible links to un-clutter the display of large highly connected hyperbolic space.

The present invention provides a system and method for visualizing both cyclic and non-cyclic relationships in large hierarchical graphs by using invisible links. These invisible links effectively reduces the clutter in the display and increases the ease with which these large hierarchical graphs can be navigated. Accordingly, by utilizing the present invention, cyclic and non-cyclic relationships in a large highly connected hyperbolic space can be selectively analyzed by the user in a clear and uncluttered manner.

Accordingly to one embodiment, the present invention only displays the primary directed non-cyclic links. All other types of links (e.g., non-tree links or cross-links) are invisible to the user, but stored internally as a property of each node. When the user navigates/clicks on the node, the invisible links associated with the selected node appear. Accordingly, the present invention allows a user to focus on the hierarchy of interest without being distracted by the other secondary links that are not of interest.

According to the method, the present invention performs the following steps. First, the present invention displays only the primary links and makes all non-primary links invisible to the user. The non-primary links (e.g., non-tree links or secondary links) are stored as placeholders in each node. Second, upon user selection the present invention automatically moves (e.g., maps and unmaps) the secondary child and sub-nodes associated therewith to the current selected node. Third, the present invention automatically restores (i.e., returns the previously moved secondary child and related sub-nodes to the original location in the hyperbolic space) upon receipt of a restore command.

In the presently preferred embodiment, the visualization technique of the present invention is implemented by using an invisible link processor to execute an invisible link program. Initially, the invisible link processor only shows or displays the primary links (e.g., the parent-child path) of each node. All other non-primary links (e.g., secondary links or non-tree links) are invisible (i.e., not displayed for the user). A link table for defining the links, both primary and non-primary, for each node in the hyperbolic space is provided. The link table is accessible to the invisible link processor.

When a user focuses on a node, the invisible link processor displays any invisible links related to that node. For example, when the user clicks on a node that contains a number of invisible links, these invisible links are extracted from a link table and displayed under the node. Each invisible link represents a path to a node in a different branch of a hierarchical space. Then, the user can select any one of the paths.

After the user makes a selection, the invisible link processor automatically maps the selected node with its children are from their original location in the hyperbolic space (e.g., other branches of the tree) to the current focused node. The selected node and children are also unmapped from their original location in the hyperbolic space. A link history log, placeholders, and a link table are used by the invisible link processor to restore the original state of the hyperbolic space. The link history log records the user actions and resulting internal operations (e.g., map and un-map). Placeholders are provided to hold the place of a node and associated child nodes prior to mapping the node to another location. These placeholders can be subsequently used to restore a previously moved node and its children to its original location. A cycle handling mechanism is provided to track a current node's ancestors prior to performing a map operation, thereby preventing recursive mapping.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE PREFERRED EMBODIMENT

A method and apparatus for visualizing both cyclic and non-cyclic relationships in large hierarchical graphs by using invisible links are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

The present invention utilizes the following novel components: (1) invisible links, (2) link tables, (3) link history logs, and (4) placeholders. The present invention employs a link table, link history log, and placeholders to check and track relationships (e.g., links) among nodes including cyclic conditions. The visualization technique of the present invention allows a user to freely focus on the hierarchy of interest without being disrupted by extra cross lines and intersections. Each of these components is described in greater detail hereinafter.

Before delving into a description of the teachings of the present invention, a few definitions are in order. In a directed cyclic hierarchical hyperbolic space, a node (except for a root) has exactly one primary parent. If a node has more than one parent, then exactly one parent is designated as the primary parent. The path from a node's primary parent to the node is called the primary path. The other parents are called secondary parents, and the link from a node's secondary parent to the node is called a secondary path. The link from a node's secondary parent back to its ancestors is called a back path, which form a cycle.

For example, the path from the table contents to the document is a direct hierarchical link, called the primary path. The path from the document to the table of contents and the path to relate back the document with the table contents form a cyclic link.

Client-Server System 100

Figure 1:
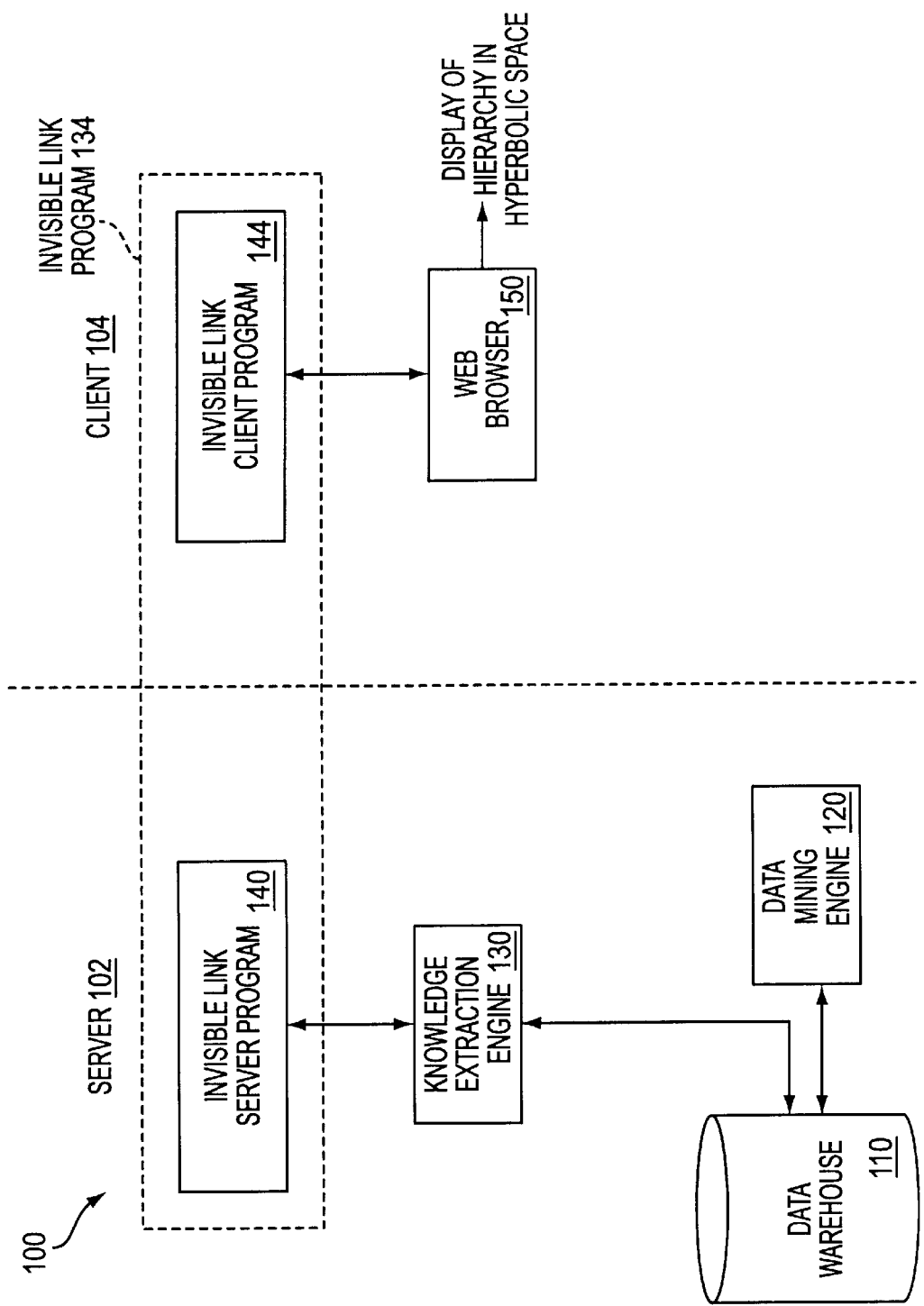
FIG. 1 illustrates a client-server system in which the invisible link program of the present invention can be implemented.

FIG. 1 illustrates a client-server system 100 in which the invisible link program 134 of the present invention can be implemented. The system 100 includes a server machine 102 and a client machine 104. The server machine 102 includes a data warehouse 110 for storing data. A data mining engine is coupled to the data warehouse 110 for adding new data records, for modifying existing records (e.g., updating existing records with new data fields, etc.), and for analysis of the data. For example, the data warehouse 110 can serve as a repository for the documents that are published on a Web site.

A knowledge extraction engine 130 is coupled to the data warehouse 110 for processing the data in the data warehouse and for generating hierarchical graphs related to the data. For example, the knowledge extraction engine 130 can generate data files having a tree format (e.g., a tree file—.tre file) that is provided as input into the invisible link program 134 of the present invention. The components and operation of a preferred embodiment of the invisible link program 134 of the present invention is described in greater detail hereinafter with reference to FIG. 2.

When implemented in a client-server architecture, the invisible link program 134 can includes an invisible link server program 140 that resides on the server machine 102 and an invisible link client program 144 that resides on the client machine 104. It is noted that in a non-distributed architecture, the invisible link program 134 can reside entirely on a single machine (e.g., a personal computer (PC)).

The client machine 104 typically includes a browser program (e.g., Netscape's Navigator or Microsoft's Explorer) that is coupled to the invisible link client program 144 to receive a display of a hierarchy in hyperbolic space provided by the invisible link program 134.

Figure 2:
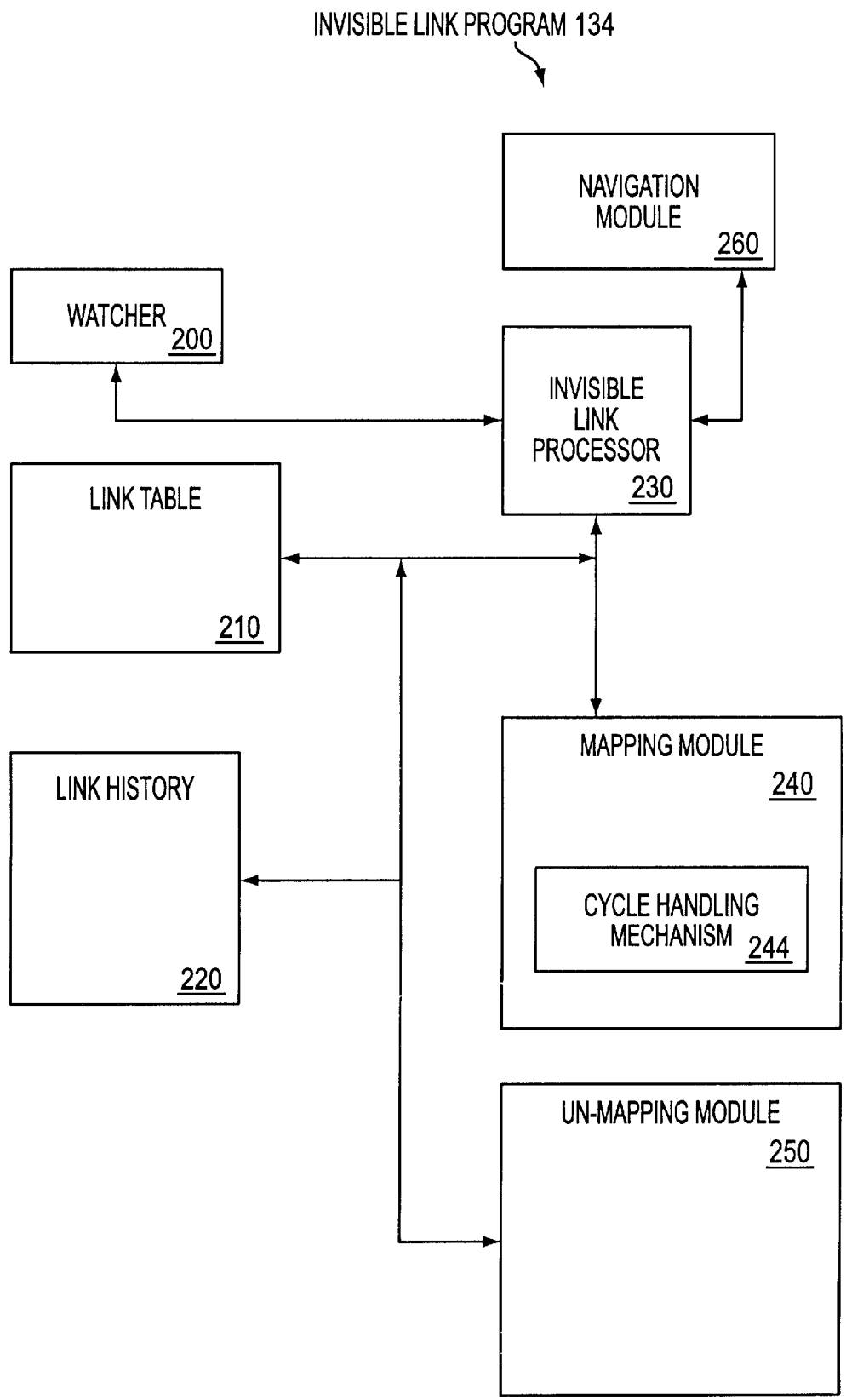
FIG. 2 is block diagram illustration in greater detail the invisible link program of FIG. 1.

FIG. 2 is a block diagram illustrating in greater detail the invisible link program 134 of FIG. 1. The invisible link program 134 includes a watcher 200, a link table 210, a link history log 220, an invisible link processor 230, a mapping module 240, an un-mapping module 250 and a navigation module 260. The watcher 200 interfaces with the web browser 150 and detects events, such as how a user navigates through hyperbolic space. User actions, such as navigating the hierarchical graph, pulling the graph, etc. are detected by the watcher 200. The watcher 200 detects the user actions (e.g., select, scroll, move, drag, or other actions performed by the user and input from a keyboard, mouse, or a cursor control device) and provides these as inputs to the invisible link processor 230.

The link table 210 is generated based on the input data, which can be hierarchical data (e.g., a hierarchical tree file, such as a .tre file). The link table 210 is defined at hyperbolic space initialization time based on the input hierarchical data. The link table 210 includes information for each node in a hyperbolic space. This information can be organized into different fields. These fields can include, but are not limited to, primary incoming links, secondary incoming links, immediate out-going link, and invisible links (1–n cross links). TABLE I is an exemplary link table associated with an exemplary hierarchical graph of FIG. 4.

TABLE I

| | LINK TABLE | | | |
|---|---|---|---|---|
| NODE | PRIMARY INCOMING LINK | SECONDARY INCOMING LINK | IMMEDIATE OUT-GOING LINK | INVISIBLE LINK (1-N CROSS LINKS) |
| A | X → A | NONE | NONE | NONE |
| B | X → B | NONE | NONE | B → D |
| C | Y → C | NONE | NONE | NONE |
| D | Y → D | B → D | D → E; D → F | D → X; D → G |
| E | D → E | NONE | NONE | NONE |
| F | D → F | NONE | NONE | NONE |
| G | Y → G | D → G | G → I; G → H | NONE |
| H | G → H | NONE | NONE | NONE |
| I | G → I | NONE | NONE | NONE |
| X | Y → X | D → X | X → A; X → B | NONE |
| Y | NONE | NONE | Y → C; Y → D; Y → G; Y → X | NONE |

The link history log 220 records the navigation moves made by the user and also the operations or actions performed by the invisible link processor 230. These operations or actions can include mapping operations that are handled by the mapping module 240, un-mapping operations that are handled by the un-mapping module 250, cycle determination that is handled by the cycle handling mechanism 244, and navigation operations (e.g., focus and out-of-focus) performed by the navigation module 260.

Preferably, the link history log 220 records previous link paths of a node while it is in focus. Furthermore, the link history log 220 contains information for mapping a cross node and its children that are pointed to by an invisible link from their original structure to the current focused nodes. The link history log that is described below in TABLE II contains two parts: a link (path) and an operation (actions).

TABLE II

| LINK HISTORY LOG | |
|---|---|
| Link | Operation |
| navigation (in focus) | if the current node has invisible links, then display all invisible paths |
| map | map the node and its children connected by a selected invisible path |
| unmap | unmap the node and its children from their original structure |
| placeholder | hold the places of the node in their original structure |
| navigation end (not in focus) | unmap the node from the current node and re-map the nodes back to their original structure pointed by the placeholder |
| cycle | track the current node's ancestors for managing loops |

Invisible Link States

According to one embodiment of the present invention the invisible-link processor 230 is utilized to implement the visualization method and system of the present invention. The invisible-link processor 230 can have the following invisible link states: an idle state, a focus state, a selection state, and a navigation state. FIGS. 3A–3D illustrate the internal processing for each of these states.

Idle State

Figure 3A:
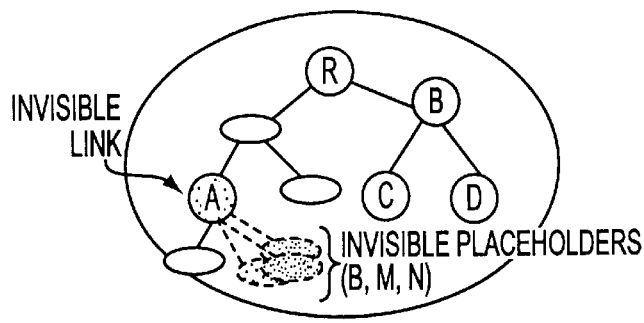
FIGS. 3A–3D illustrate processing states of the invisible processor of the present invention in response to user action.

FIG. 3A illustrates the idle state. During the idle state, the invisible-link processor 230 displays a hyperbolic space with invisible link as if it had no non-primary links (i.e., the non-primary links are not represented with extra lines and intersections). A node that has invisible links can be identified with a unique color. If a node has secondary links, then the node contains invisible placeholders for each secondary link. For example, node A has three secondary links to nodes B, M, and N, and thus has an invisible placeholder for each of these nodes (i.e., a B placeholder, a M placeholder, and a N placeholder.)

Focus State

Figure 3B:
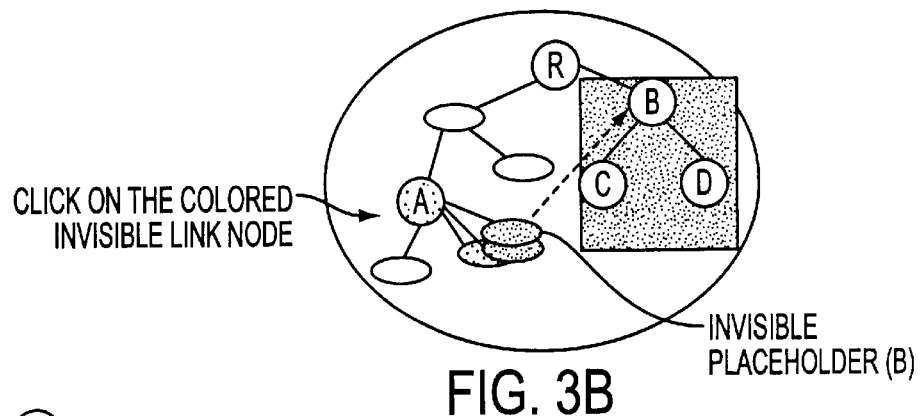

FIG. 3B illustrates the focus state. When a user clicks on a node (e.g., node A) that has directed cyclic links (backward links), a number of placeholders (e.g., placeholder B, M, and N) are drawn from the node. Each placeholder represents an invisible "secondary path" with and without cycles. A user can dynamically select a "secondary path" for navigation.

Selection State

Figure 3C:
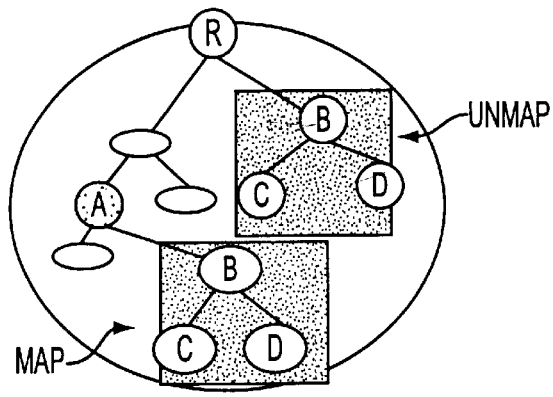

FIG. 3C illustrates the selection state. The invisible-link processor uses parallel mapping and unmapping methods to move the selected node with its children (e.g., nodes B, C and D) from their original structure (connection to the R node) to the current focused node (i.e., to node A). A placeholder is placed in the original structure at node R for subsequent use in restoring the original state.

Navigation State

Figure 3D:
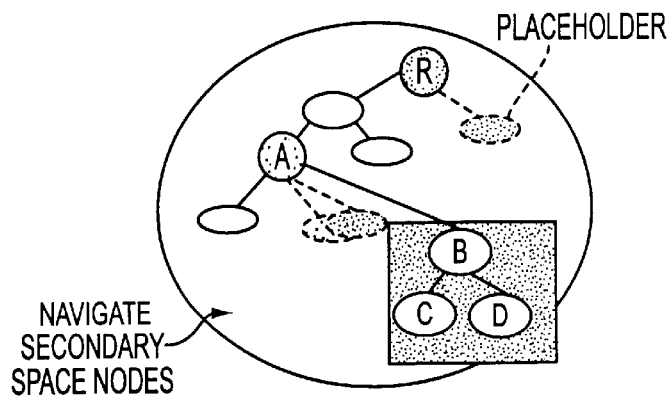

FIG. 3D illustrates the idle state. After the selected node and its children are mapped under the current focused node, user can start his browsing and navigation. In this example, the user can browse nodes B, C and D.

The present invention also provides a set of interfaces or encapsulation mechanisms (e.g., a API) to communicate with existing tools (e.g., existing hyperbolic tree engines).

Figure 4:
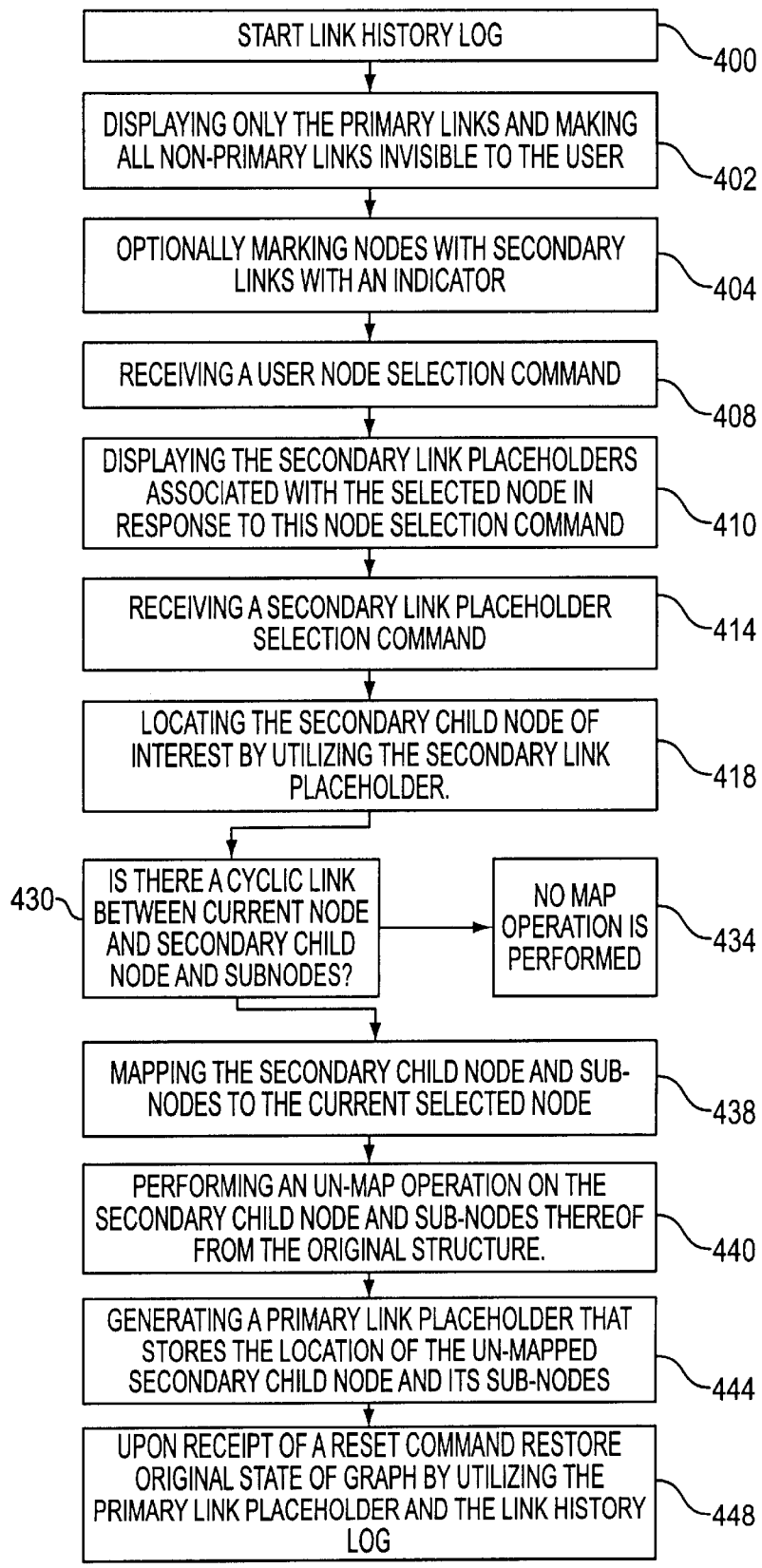
FIG. 4 is a flow chart illustrating steps carried out by one embodiment of the invisible link program of the present invention.

FIG. 4 is a flow chart illustrating the steps performed by one embodiment of the invisible link program of the present invention. In step 400, a link history log is started that records any link changes to the hierarchical graph. In step 402, the invisible link processor 230 displays only the primary links and makes all non-primary links invisible to the user. In step 404, those nodes with non-primary (e.g., secondary links or paths) can be optionally marked with an indicator (e.g., a particular color, shading, or otherwise marked with an identifier) to inform the user that a particular node has non-primary links that are currently invisible. By marking the nodes with non-primary links, these nodes can be readily differentiated from other nodes that have only primary links.

In step 408, a user node selection command is received. The user node selection command can be generated when a user selects a particular node of interest (e.g., when a user double-clicks on a node of interest). In response to this node selection command, in step 410 the non-primary (e.g., secondary) link placeholders associated with the selected node are displayed. Each placeholder represents a secondary link to a node elsewhere in the hyperbolic space. It is noted that the node being pointed to may not even be visible to the user in the display (i.e., the node may be minimized since there may be millions of nodes in the hyperbolic space).

In step 414, a secondary link placeholder selection command is received. The secondary link placeholder selection command can be generated when a user selects one of the placeholders (e.g., when a user double-clicks on a placeholder of interest). In step 418, the secondary child node of interest is located by utilizing the secondary link placeholder.

In step 430, a determination is made whether a cyclic link (or cycle) exists among the secondary child node, its sub-nodes, and the current node. If a cycle is detected, in step 434 a map operation is not performed. Since a cycle is essentially a loop, step 434 prevents the recursive mapping of the cycle. If no cycle is detected, in step 438, a map operation is performed. The map operation connects the secondary child node and sub-nodes that is linked by the selected placeholder to the current selected node. The map operation is described in greater detail hereinafter.

In step 440, a un-map operation is performed on the secondary child node and sub-nodes thereof. The un-map operation disconnects the secondary child node and sub-nodes from the original location (e.g., a primary parent node) in the hierarchical graph. The un-map operation is described in greater detail hereinafter. It is noted that the map and un-map steps can be performed simultaneously.

In step 444, a primary link placeholder is generated that stores the location of the un-mapped secondary child node and its sub-nodes (e.g., the primary link from the parent of the secondary node to the secondary node). The primary link placeholder is utilized subsequently to restore the original hierarchical graph.

In step 448, upon receipt of a reset command, the original state of the hyperbolic space is restored. The link history log started in step 400 records all link changes to the hierarchical graph made during steps 402 to 448. The original state of the hyperbolic space is restored by employing the link table, the link history log, and the primary link placeholder generated in step 444. For example, the previously mapped secondary node and associated sub-nodes are automatically un-mapped from the current node and mapped to the previous parent by utilizing the placeholder generated in step 444. The reset command can be initiated when a user selects a reset option.

This invisible link mechanism of the present invention provides solutions to meet the needs for directed cyclic & non-cyclic hierarchical links in a large hyperbolic space. The invisible link mechanism retains the original hyperbolic simplicity by only displaying the primary links. For example, the hyperbolic space displayed by the present invention remains with the original n nodes and n-1 edges. Furthermore, the invisible link mechanism of the present invention automatically maps a secondary node and sub-nodes (that may not be visible on the display) to a current selected node. An easy-to-use graphical user interface (GUI) is also provided for communicating with the invisible link mechanism. Moreover, the invisible link mechanism restores the original hierarchical graph without having to manually track the location of in the hyperbolic space from where a particular secondary node and sub-nodes are disconnected and the location in the hyperbolic space to where a particular secondary node and sub-nodes are connected.

The display technique of the present invention displays the invisible links only when the user focuses on the node. The display technique of the present invention also automatically tracks any changes to the hierarchical graph so that the user can restore the original graph after navigation. Accordingly, the present invention makes it possible for a user to easily navigate through interconnected paths (forward and backward) without being distracted by extra lines and intersections that prior art approaches display.

By using the present invention, users can easily visualize large highly connected graphs (cyclic & non-cyclic) in a hyperbolic space without the clutter of prior art displays. During the visualization, only the primary links are shown. All other types of links (e.g., non-tree links or secondary links) are made invisible, but are stored as a property of a node. A placeholder is provided to track the links including cyclic conditions. These invisible links dynamically appear when the user navigates or clicks on a node.

The visualization method and system of the present invention only displays the primary links and hides the other types of links, thereby allowing a user to freely focus on the hierarchy of interest without being distracted by extra cross lines and intersections that are displayed by prior art approaches.

Example of a Directed Hyperbolic Space with Cycles

Figure 5:
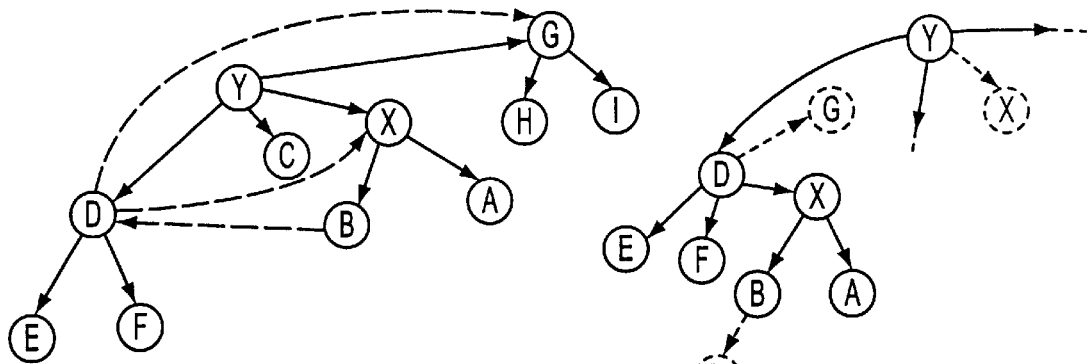
FIG. 5 illustrates an exemplary hierarchical graph having a cyclic link.

FIG. 5 illustrates an exemplary hierarchical graph in hyperbolic space. The primary paths are shown as solid lines, and the secondary paths are shown as broken lines. For example, node X has two parent nodes: (1) primary parent Y and (2) secondary parent D. Consequently, node D has a secondary child (i.e., node X). Similarly, node D has two parents: (1) primary parent node Y and (2) secondary parent node B. Consequently, node B also has a secondary child (i.e., node D). The link (or path) from node D to node X is a secondary path. Likewise, the link (or directed path) from node B to node D is a secondary path, and the directed path from node D to node G is a secondary path.

This exemplary directed graph includes a cycle between node X, node B, and node D. Node D, X's child node B has the invisible link property; i.e. it has links to secondary child nodes. The prior art approaches represent this cyclic relationship by drawing two extra lines: a first line from node D to node X and a second line from node B to node D.

Example of a Directed Hyperbolic Space with Invisible Links and Placeholders

FIGS. 6A–6D are displays of the hyperbolic space of FIG. 5 that are generated by the invisible processor of the present invention in response to user action.

Figure 6C:
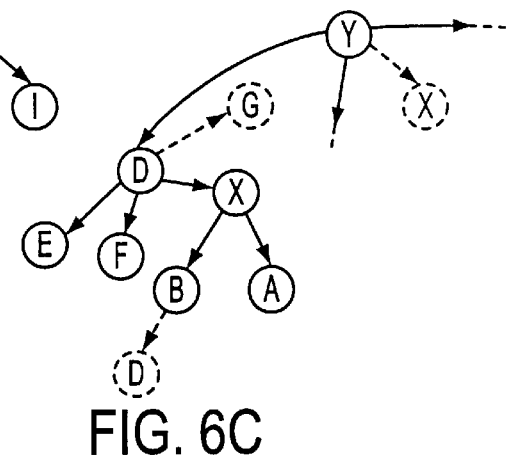
FIGS. 6A–6D are displays of the graph of FIG. 5 generated by one embodiment of the present invention.
Figure 6A:
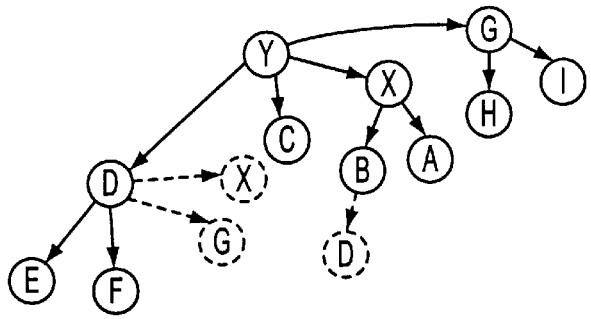

FIG. 6A illustrates the display initially presented to a user when the user begins navigating. It is noted that the invisible link program 134 displays only the primary links for each node (i.e., non-tree links and secondary links are not displayed). As described in greater detail hereinafter, the invisible link program 134 utilizes placeholders for managing invisible links.

In order to differentiate between node without invisible links and those nodes with the invisible link properties, it is preferable for the nodes with the invisible link properties (e.g., node B and node D) to be denoted by an indicator. For example, nodes with invisible link properties can have a different appearance (e.g., highlighted with color or marked with a special identifier) than those nodes without an invisible link.

For example, with reference to TABLE I, node D has 2 parents: (1) primary parent Y and (2) invisible secondary parent B. The present invention provides two placeholders for node D: (1) a first placeholder to node X and (2) a second placeholder to node G. Similarly, node X has 2 parents: (1) primary parent Y and (2) invisible secondary parent D. Node B has one parent X and the present invention provides one placeholder to node D. The information related to the links (both primary and non-primary) for each node is stored in a link table. An exemplary link table corresponding to the hyperbolic space of FIG. 5 is provided in TABLE I.

Figure 7:
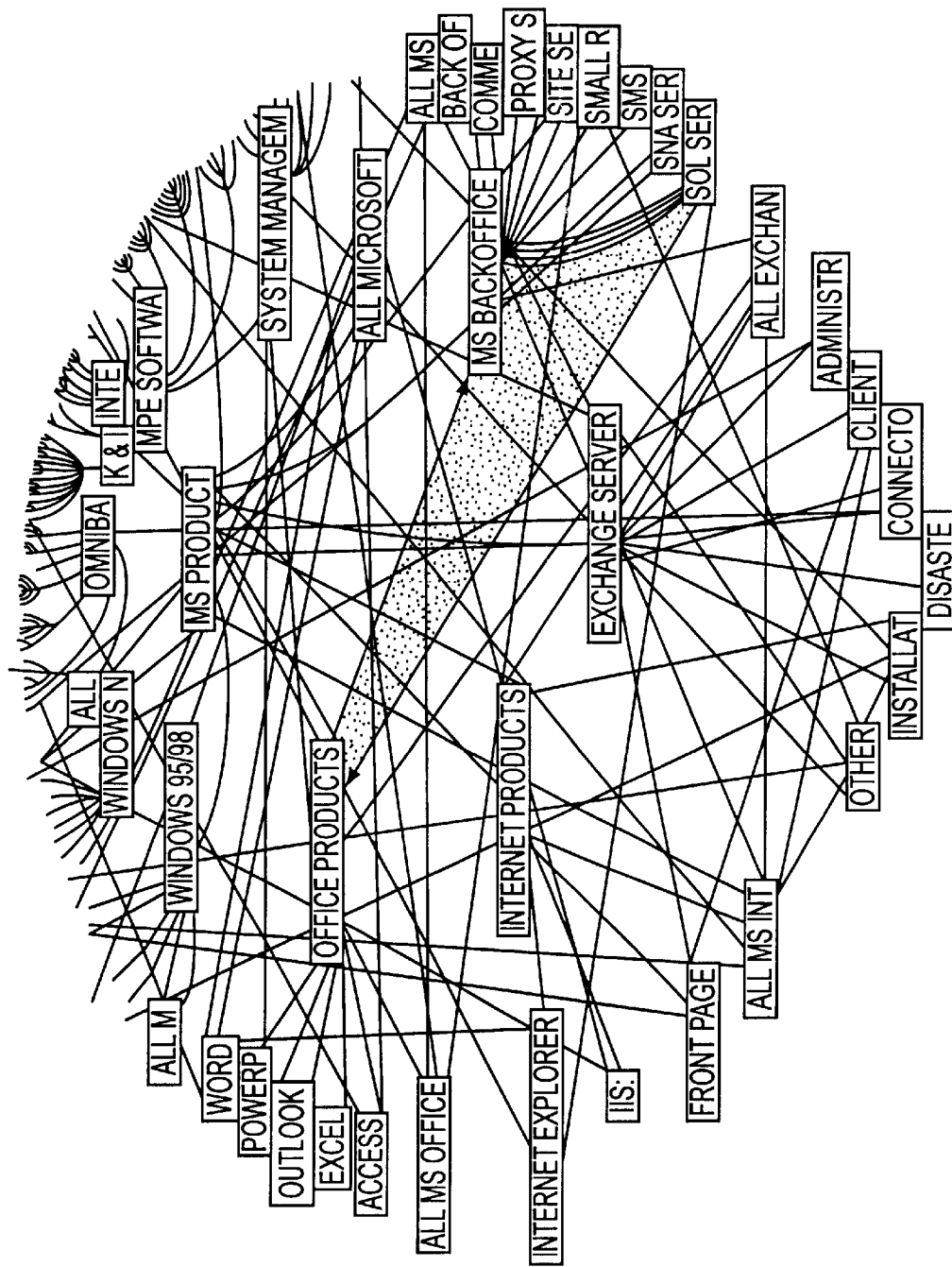
FIG. 7 illustrates an exemplary hierarchical graph and how prior art visualization approaches present or display the hyperbolic space representation of the hierarchical graph where the representation is both cluttered and confusing.

Instead of drawing extra lines (as illustrated in FIG. 7), this new technique uses an Invisible Link Placeholder residing in the invisible link node B and in node D to represent the secondary paths to node D and nodes X and G, respectively.

Exemplary Displays

FIGS. 6A–6D illustrate the displays generated by the invisible-link processor 230 in response to user action. These displays correspond generally to four different processing states managed by the invisible-link processor 230 described previously.

During the idle state, the invisible-link processor 230 displays the hyperbolic space with only the primary links and without the extra lines and the intersections that denote non-primary links. The nodes that have invisible links can have an indicator that denotes this fact. Preferably, the indicator is a unique color. For example, nodes with invisible links can be identified with a unique color. The unique color indicates that the nodes include secondary links. As explained previously, the present invention utilizes an invisible placeholder to track each secondary link.

When a user selects a node (i.e., "focuses" on a particular node) that has a non-primary (e.g., a non-tree link or secondary link), the invisible-link processor 230 of the present invention displays one or more placeholders associated to these non-primary links. For example, referring to FIG. 5B, the invisible-link processor 230 displays two placeholders (i.e., placeholder X and placeholder G) with a line connecting each placeholder with the current selected node. The placeholder X represents an invisible secondary path with cycles (i.e., cyclic link), and the placeholder G represents an invisible path without cycles (i.e., a non-cyclic link).

As noted earlier, a user can select a "secondary path" for navigation. Upon selection of a particular path, the invisible-link processor 230 dynamically modifies the hyperbolic space to display the selected node and its sub-nodes.

The invisible-link processor 230 uses parallel mapping and unmapping methods to move the selected node with its children from their original location in the hyperbolic space to the current focused node. The invisible-link processor 230 also generates a placeholder in the location from where the secondary child and its sub-nodes are disposed in the original structure.

FIG. 6C illustrates a display after a user selects the X placeholder for further navigation. Upon user selection, the node X and its associated sub-tree (e.g., children B and A) are automatically un-mapped from node Y and mapped to node D. In addition, the present invention dynamically displays node X and its associated sub-tree as shown so that the user can easily navigate node X and its associated sub-tree.

It is noted that node Y now includes a primary link placeholder X for storing the primary link between node Y and node X. The primary link placeholder X is different from the placeholder X of node D that stores the secondary link between node D and node X.

Figure 6D:
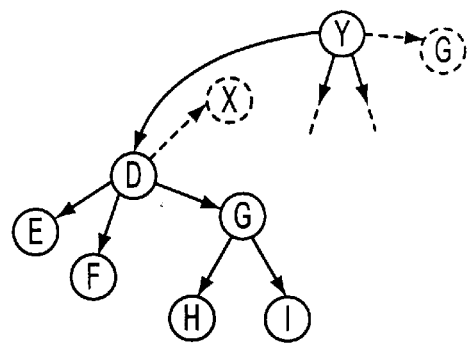
Figure 6B:
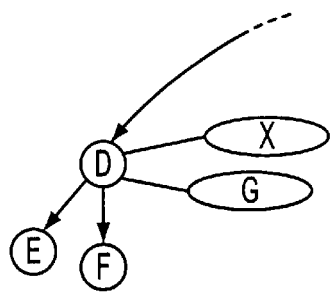

FIG. 6D illustrates a display after a user selects the G placeholder for further navigation. Upon user selection, the node G and its associated sub-tree (e.g., children H and I) are automatically un-mapped from the Y node and mapped to node D. Also, node G and its associated sub-tree are automatically displayed as shown so that the user can easily navigate node G and its associated sub-tree. It is noted that even if nodes X and G were out of the field-of-view of the user, the present invention dynamically un-maps, maps, and displays these nodes in the current field-of-view. It is noted that node Y now includes a primary link placeholder G for storing the primary link between node Y and node G. The primary link placeholder G is different from the placeholder G of node D that stores the secondary link between node D and node G.

After the selected node and its children are mapped under the current focused node, the user can resume browsing and navigating the hyperbolic space. For example, referring again to FIG. 6C, a user can navigate nodes X, B, and A. It is noted that if the user selects node B, the present invention displays a placeholder D. However, when the user selects placeholder D for navigation, the present invention by utilizing the cycle handling mechanism 244 detects the cycle formed by nodes D→X→B→D and does not perform the un-map and map operations. This mechanism 244 of the present invention prevents recursive mapping which leads to system crashes because of the execution of an endless loop.

TABLE III illustrates an exemplary link history log that is created during a user's navigation of the hyperbolic space. The link history log is useful to the invisible link processor 230 for restoring the previous state of the hyperbolic space prior to user navigation and actions. The previous state of the hyperbolic space can be restored in response to a RESET command from the user.

TABLE III

EXAMPLE OF A LINK HISTORY LOG

| Link History | Log Description |
| --- | --- |
| Log_1 | navigation (in focus) - node D |
| Log_2 | placeholder (X) - forward link |
| Log_3 | map (X) |
| Log_4 | unmap (X) |
| Log_5 | placeholder (Y - unmapped node) - for use in restoring state |
| Log_6 | navigation end - node D (responsive to user RESET) |

According to one aspect of the present invention, an "invisible link" technique with link tables, link history log, and placeholders for linking a large highly connected graph (cyclic and non-cyclic links) without cluttering the display is provided. The invisible link technique of the present invention displays only the primary links are shown on the screen. All other cross-links (e.g., secondary links) are invisible to the user.

Figure 8:
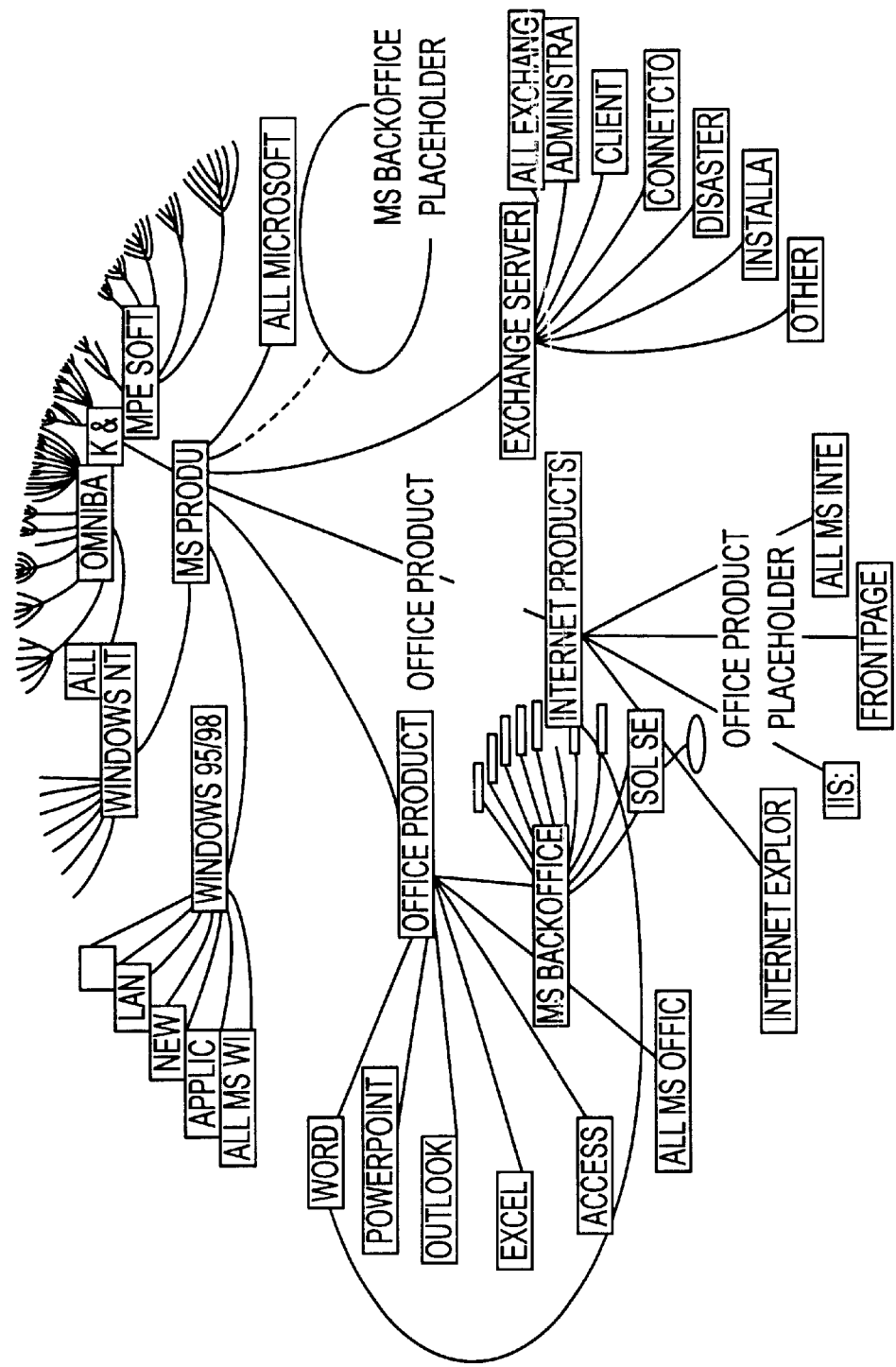
FIG. 8 illustrates the use of invisible links to represent the hierarchical graph of FIG. 6, where the representation enables the user to easily navigate through different forward and backward links without being overwhelmed with many cross lines and intersections.

FIG. 8 illustrates the display of the present invention that utilizes invisible links and placeholders. The invisible link technique of the present invention enables a user to reach the MS BackOffice node from the Office Product node, and to reach the Office Product node from the SQL Server node to locate other office products. In sharp contrast to prior art approaches, the invisible link technique of the present invention enables the user to easily navigate through different forward and backward links without being overwhelmed with many cross lines and intersections.

Application of the Present Invention to Data Mining Applications

The invisible link visualization technique of the present invention may be applied to various applications. For example, three data mining application that can advantageously utilize the present invention include, but is not limited to, (1) Web uniform resource locator (URL) path navigation, (2) customer call center document navigation, and (3) Web site index creation.

Web URL Path Navigation

One of the common problems encountered by electronic store managers is how to target advertisements and increase product sales. A Web URL path navigation application can be utilized as one of the solutions to this problem. This application provides a large highly interconnected graph with cycles in a hyperbolic space to visualize the pages that a customer visits (e.g., clicks through) on the electronic store's web site. The nodes are web pages and the edges are uniform resource locator (URL) links. As can be appreciated, if these links are visualized with prior art approaches, the display would be cluttered and confusing, thereby making it very difficult to access trends and derive value from the application. However, when this application incorporates the invisible links technique of the present invention to navigate nodes from other branches of the hyperbolic space. In addition, this application can access and use the information provided by the link table and the link history log of the present invention to track and visualize cross-links and cycles.

Customer Call Center Navigation

The second data mining application is a customer call center application. The assignee of this invention maintains an Internet web-site based troubleshooting application called InterView. InterView was developed as an interactive web based troubleshooting system, which guides a user by a question answer dialog to the right solution of the problem. InterView's knowledge base can be best described by a huge decision graph of nodes.

The Knowledge base is organized in domains, knowledge areas that cover a similar topic, while each domain consists of several hundred interconnected nodes. Due to the fact that the knowledge base is more general than a strict decision tree, the invisible link extension of the hyperbolic space provided by the present invention is needed to visualize the knowledge base correctly.

A hyperbolic space viewer in InterView can be utilized for the following purposes:

1. Navigation and overview of the domain The users, as well as the authors, can apply and use the hyperbolic space visualization technique of the present invention to navigate through the network of nodes to get the right solution. The present invention allows users (especially experienced users) to identify and find the right solution from the knowledge base quickly.

2. Authoring and maintenance of the domain The hyperbolic space viewer of the present invention can include additional functions, such as copy, cut, link, to allow the knowledge authors to easily maintain the structure of very big domains.

3. Color based statistical information mapping To allow efficient content and knowledge management, the InterView application collects statistical data, such as access, knowledge success/failure counts, etc. To provide an efficient manner in which to interpret this statistical data in the context of the knowledge itself, colored nodes are utilized in the hyperbolic space to represent the data. For example, the more often a node is used or accessed, the lighter the color that is applied. This representation allows authors easily to identify areas in the knowledge base where content maintenance or changes have to be made.

Without the invisible link technique, the hyperbolic space viewer could only be used in a very limited way to represent InterView's knowledge base. The invisible link technique of the present invention allows the users as well as the authors to focus fully on the hierarchy of the content and not on the complexity of the network.

Web Site Index Creation

Some existing sites on the Internet provide an index, which describes how the web site is structured. Very often this index already has a hierarchical structure and represents directly the page hierarchy of the site. This hierarchical index structure provides a good help for experienced as well as novice users to navigate quickly to the right content page of the web site.

Unfortunately, such an index is not available for every existing web site. Creating such an index automatically based on a given URL would enable the user to browse quickly the information structure of a web site, even though the user is completely unfamiliar with this site. In general, web sites can contain several hundreds of different web pages. A presentation of such an index as a hyperbolic tree enables the user to focus on a special subtopic of this hierarchy as well as navigate quickly through the index.

One problem is that general web sites very often do not consist of strict hierarchical structures (i.e., several web pages can be referenced from different places on the web site itself). For example, the index web page may be referenced from almost every page's navigation bar.

In these cases, the invisible link mechanism of the present invention becomes very helpful. The user can focus on the hierarchical structure to navigate the web site index, but does not miss any cross-links between the different web pages.

A service can be provided that allows users to create automatically a web site index, which is visualized as a hyperbolic tree for navigational purposes. The user provides an initial URL as well as a maximal depth to scan the given web sites URL. Based on the given information a web robot scans the given web site and derives the hyperbolic tree index hierarchy from the given web site's hierarchy. The depth of the hierarchical index is determined based on the given depth value. In the hyperbolic tree visualization each node represents one web page. The label of the node is derived based on several rules and heuristics from the title, headers or images names of the original HTML source of the pages. Clicking on the node in the hyperbolic tree hierarchical visualization opens the original web page in the web browser of the user.

This visualization method of the present invention allows users easily to navigate and discover the structure of new or unknown web sites. Even experienced users very often prefer to navigate a web site using the hyperbolic tree index because it allows quickly moving or switching between different pages of the web site.

Web sites may advantageously use such a system that incorporates the visualization scheme of the present invention to generate hyperbolic tree based indexes of those web sites automatically. Such a system is especially beneficial for web sites with frequently changing content or dynamically built structures.

In summary, there are at least seven advantages of this invention over the prior art approaches. First, the present invention generalizes a direct multi-path hyperbolic tree to a hyperbolic space for many applications without the clutter of extra lines and intersections. Second, the present invention maximizes effective use of available screen to visualize large hierarchical graphs using invisible links in a hyperbolic space. Third, the present invention displays only the primary (direct parent-child, no-cross) links on the screen making all other cross-links invisible to the user. Fourth, the present invention uses invisible-path placeholders, a link table, and history log to allow the dynamic processing of both cyclic and non-cyclic links. Fifth, the present invention provides a set of interfaces or encapsulation mechanisms (e.g., a API) to communicate with existing tools (e.g., existing hyperbolic tree engines). Sixth, the present invention provides a simple visible graphic user interface scheme (double clicks) to allow user to dynamically select any non-primary paths and cycles. Seventh, the present invention identifies nodes with invisible multi-paths and cycles with a distinct indicator (e.g., a predetermined color scheme).

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. A computer-implemented method of displaying directed cyclic and non-cyclic hierarchical links in a hyperbolic space having a plurality of nodes comprising:

receiving a hyperbolic space input having a plurality of nodes, an original state, a plurality of primary links between nodes, and a plurality of non-primary links between nodes, the plurality of nodes having a first node;

displaying the primary links between nodes;

making the non-primary links between nodes invisible;

utilizing at least one non-primary placeholder associated with the first node to track a non-primary link for the first node; and making visible the non-primary placeholder when the first node is selected;

wherein in response to selection of a non-primary placeholder by a user:
automatically mapping a secondary node and associated sub-space to the first node;
automatically un-mapping the secondary node and associated sub-space from a primary parent node; and
automatically displaying the secondary node and associated sub-space in the proximity of the first node.

2. The method of claim 1 further comprising:

prior to the step of automatically un-mapping the secondary node and associated sub-space from the primary parent node, determining if there is a cyclic link between the first node, the secondary node, and the sub-space associated with the secondary node;

if yes, not performing the steps of mapping, un-mapping, and displaying the secondary node and the associated sub-space; and if no, proceeding with the steps of mapping, un-mapping, and displaying the secondary node and the associated sub-space.

3. The method of claim 1 further comprising:

before the step of un-mapping, generating a primary link placeholder for storing the link between the primary parent node and the secondary node:

wherein the primary link placeholder is utilized to restore the original state of the hyperbolic space.

4. The method of claim 1 further comprising:

restoring the original state of the hyperbolic space in response to a reset signal.

5. A data pressing system comprising:

a source for providing a hyperbolic space having a plurality of nodes, an original state, a plurality of primary links between nodes, and a plurality of non-primary links between nodes, the plurality of nodes having a first node;

an invisible link program coupled to the source for receiving the hyperbolic space, displaying the primary links between nodes, and making the non-primary links between nodes invisible;

at least one non-primary placeholder associated with the first node in the hyperbolic space for tracking a non-primary link for the first node, the non-primary placeholder accessible to the invisible link program;

wherein the invisible link program in response to selection of the non-primary placeholder automatically un-maps a secondary node and associated sub-space from a current parent node and automatically maps the secondary node and the associated sub-space to the first node.

6. The data processing system of claim 5 wherein the invisible link program automatically displays the secondary node and associated sub-space in the proximity of the first node.

7. The data processing system of claim 6 further comprising:

at least one primary link placeholder for storing the primary link from the current parent node to the secondary node; and wherein the invisible link program automatically restores the original state of the hyperbolic space by utilizing the primary link placeholder and the link history log.

* * * * *